June 6, 1950          W. G. GRIMES          2,510,818
AIRCRAFT LANDING LIGHT
Filed Jan. 29, 1947          3 Sheets-Sheet 1
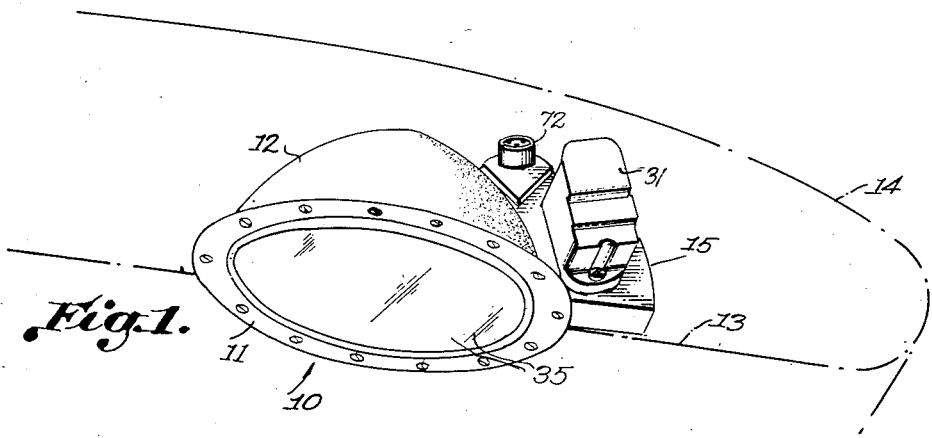
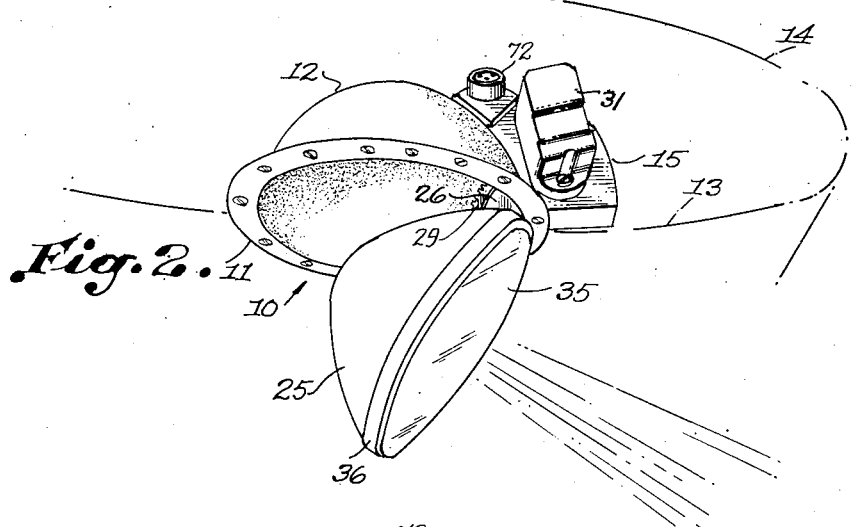
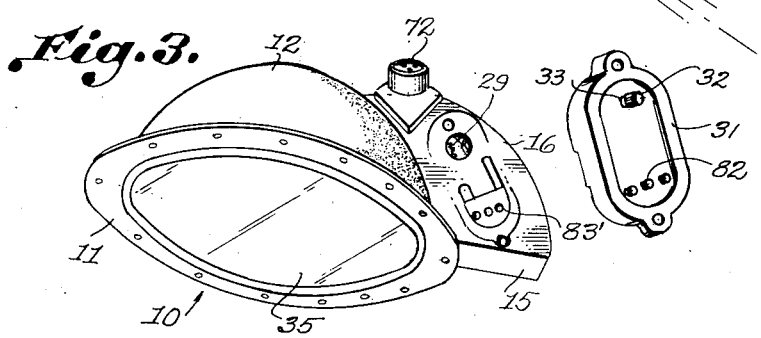
INVENTOR.
WARREN G. GRIMES.
BY Miller & Miller
ATTORNEYS.

June 6, 1950 W. G. GRIMES 2,510,818
AIRCRAFT LANDING LIGHT
Filed Jan. 29, 1947 3 Sheets-Sheet 2
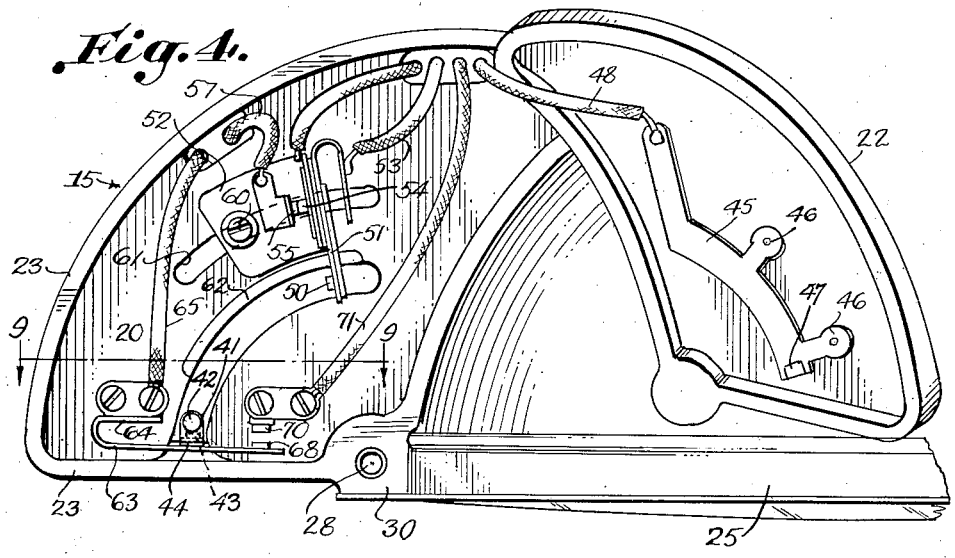
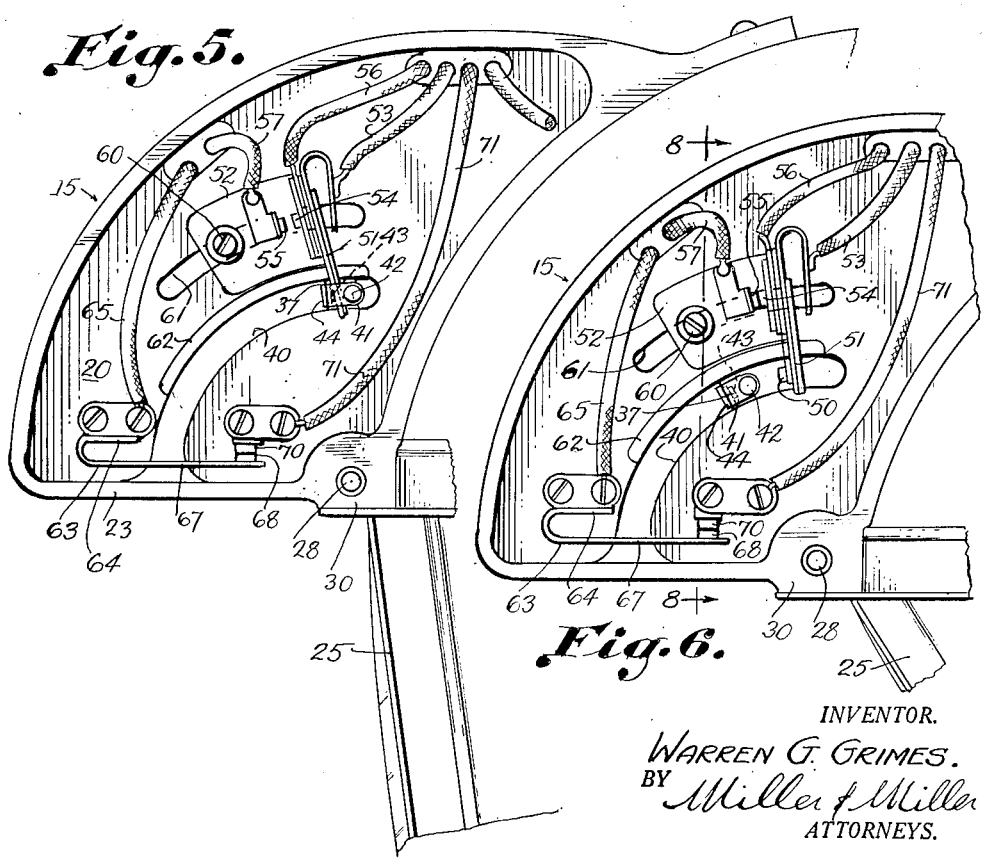
INVENTOR.
WARREN G. GRIMES.
BY Miller & Miller
ATTORNEYS.

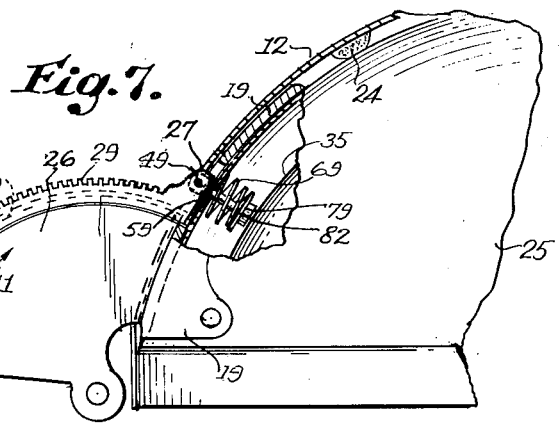

Patented June 6, 1950

2,510,818

UNITED STATES PATENT OFFICE 2,510,818

AIRCRAFT LANDING LIGHT

Warren G. Grimes, Urbana, Ohio

Application January 29, 1947, Serial No. 725,004

14 Claims. (Cl. 240—7.7)

This invention relates to an aircraft landing light and has for an object to provide an improved electrically retractable landing light for aircraft.

A further object of this invention is to provide an electrically retractable landing light wherein a shock absorbing means is provided for stopping the movement of the lamp as it approaches the fully retracted position and for simultaneously cutting off the power to the operating motor, allowing its brake to operate as it coasts to a stop without power and against the shock absorbing means.

A further object of this invention is to provide means for interrupting the power to the motor as the lamp approaches both its extended position and its retracted position, permitting the motor brake to operate to stop the movement of the lamp.

A further object of this invention is to provide an adjustably positioned contact means for stopping the movement of the lamp at any desired limits of extension within a position of between about fifty and eighty-five degrees, thus making it suitable for use on different aircraft wherein the extended angular position may vary considerably.

A further object of this invention is to provide means for interrupting the power supply so that it will necessarily cut off at a position of about 10 degrees before it is fully retracted, thus insuring that the light will be out when the lamp is retracted, even though the pilot may fail to operate a special lamp switch, if such be provided.

A further object of this invention is to provide a landing light that is an improvement over prior Patent No. 2,244,535 to the same inventor, and which utilizes the motor brake shown in prior Patent No. 2,340,052, also to the same inventor.

A further object of this invention is to provide a shock absorbing stopping means operating to hold the lamp against the force of momentum as it approaches its fully retracted position, thus relieving the gear train of the motor against strain.

With the foregoing, and other objects in view, as will hereinafter become apparent, this invention comprises the combinations, constructions and arrangement of parts hereinafter set forth, disclosed, claimed and illustrated in the accompanying drawings, wherein:

Figure 1 is a perspective view of the invention with the lamp in retracted position within the wing;

Figure 2 is a similar view with the lamp in extended position;

Figure 3 is a perspective partly exploded view of the lamp and the motor;

Figure 4 is an elevational view of the contact housing with the cover assembly and sliding contact partly removed, the lamp being in retracted position;

Figure 5 is an elevational view of the contact housing with the lamp in fully extended position;

Figure 6 is an elevation of the contact housing with the lamp in an intermediate position;

Figure 7 is an elevational view of the gear quadrant;

Figure 8 is a sectional view on line 8—8 of Figure 6;

Figure 9 is a sectional view on line 9—9 of Figure 4;

Figure 10 is a schematic wiring diagram; and

Figure 11 is a sectional view on line 11—11 of Fig. 7.

There is shown at 10 the lamp assembly of this invention as mounted by suitable fastening means through the flange 11 of the outer canopy 12 in a countersunk position within the bottom surface 13 of an aircraft wing 14. Secured to this outer canopy 12 by suitable stud screws (not shown) is a gear and contact housing assembly 15 consisting of a gear housing half 16 providing a gear chamber 17 by placing its flanges 18 against the contact housing half 20. A contact chamber 21 is provided by placing a contact housing cover 22 against the flanges 23 on the contact housing half 20.

Nestable within the outer canopy 12 against a yieldable resilient bumper 24 is an inner or lamp canopy 25 securely fastened to a flange 19 of a gear quadrant 26. This gear quadrant 26 extends through a suitable slot 27 in the outer canopy 12 and an aligned slot in the gear chamber housing flange 18 into the gear chamber 17. The gear quadrant 26 is journalled on a shaft 28 which is mounted in the apex 30 of the housing 15.

As shown in Figs. 7 and 11, the gear quadrant 26 includes an arcuate gear track 29 secured thereto by a T-web and T-slot 39. At the canopy end, gear track 29 is pivotally secured at 49 to an anchor link 59 which extends through the quadrant securing flange 19. A very strong coil spring 69 is located about the anchor link 59, one end of the spring 69 being biased against the inner side of the quadrant flange 19 and thus the inner side of lamp canopy 25, the other end abutting a washer 82 against the head 79 of the link 59. The other end of the gear track 29 has an inturned arm 83 adapted to abut the corresponding edge 84 of quadrant 26.

Secured to the housing 15 is a reversible motor and brake 31 having a power take-off gear 32 on a power shaft 33 extending through a hole 34 in the housing wall 15 so as to place the power take-off gear 32 into mesh with the gear track 29. This reversible motor and brake is more fully described in the patentee's prior Patent No. 2,340,052. This motor is so wound, as shown in Figure 10, that it may be selectively operated in either direction, and is provided with a brake which is off whenever the motor is operated, but which brake is instantaneously operated to stop the rotation of the motor whenever the motor current is cut off, all as disclosed in Patent No. 2,340,052.

Inasmuch as the motor gear 32 is in constant mesh with the gear track 29, it is apparent that the operation of the motor will cause corresponding movement of the lamp canopy 25, and that cutting off the current to the motor will serve through the motor brake, to hold the lamp canopy 25 in a position to make it has coasted while the brake is taking hold. The lamp canopy 25 has, detachably secured therein, as by the ring 36 shown in the patent to Roper No. 2,363,147, a sealed beam lamp 35 of suitable size.

When the lamp 35 is being extended, arm 83 on the quadrant gear track 29 causes the quadrant 26 and lamp canopy 25 to move with it as a unit. However, when it is being retracted, the coil spring 69 is strong enough to cause the gear track 29 and the lamp canopy 25 to move as a unit until the canopy 25 strikes the bumper 24 preventing further retraction. Although the power has already probably been cut off, as hereinafter described, the motor may coast somewhat under momentum, and such momentum and coasting could cause the take-off power gear 32 and track 29 to strip, if they continued as a unit. Due to the T-web and T-slot connection 39, the spring 69 acts to absorb the momentum and yieldably slows up the motor and then restores it to the position it would have had, had it not coasted, with the arm 83 abutting the edge 84 of the quadrant 26.

There is now to be described the details of this invention that will absorb the shock of the coasting of the lamp after the power has been cut off to move the lamp to the extended position, and further, that permits adjustment of the angle at which the lamp may direct its rays when in extended position. In addition, means are provided for automatically cutting off the current to the lamp when it has moved to within about 10 degrees of the fully retracted position, and for restoring the current when the lamp has moved about 10 degrees from the retracted position on the way to the extended position.

Secured to, but insulated from the edge of the quadrant 26, is a contact arm 37 having a lamp wire 38 extending along the quadrant 26 through the slot 27 to the lamp 35. This contact arm 37 extends through a slot 40 in housing wall 20 into contact chamber 21, where it is provided with an angular finger 41 on which is secured a tungsten contact 42. A similar contact 43 is provided on the arm 37, while an insulation block 44 is secured to the arm 37 on the side opposite from the contact 43. Both contacts 42 and 43 are electrically connected by arm 37 to the lamp wire 38.

Secured to the housing cover 22, which is made of an insulating material, is a quadrant contact member 45 yieldably mounted by means of the securing fingers 46. At one end of the quadrant contact member 45 is a tungsten contact wedge 47, while its other end has a lamp power wire 48 secured thereto. When the lamp starts to extend, finger carried contact 42 hits the tungsten contact wedge at about 10 degrees of movement, and then slides along the contact quadrant 45. As the lamp reaches extended position, the arm carried contact 43 hits and presses against contact 50 mounted on the end of strong, somewhat J-shaped spring 51 mounted on an insulation block 52. Secured to the spring 51 and thus electrically connected to the contact 50 is a second lamp power wire 53, thus providing a second path for current to reach the lamp wire 38 to thereby insure a power supply to the lamp 35.

Secured to, but insulated from the spring 51 is a motor extend contact 54, the spring 51 normally tending to hold contact 54 against a second motor extend contact 55 also mounted on the insulation block 52, the contacts 54 and 55, when separated, breaking the circuit from the motor extend power wire 56 to the motor extend wire 57 leading to the motor extend field coil 58. As the lamp 35 approaches its extended position, the gear quadrant arm 37 presses its contact 43 against the spring contact 50 to thus move the arm of the spring 51 which yields and thus separates the motor extend contacts 54 and 55, breaking the circuit to the motor extend field coil 58, and permitting the motor brake to stop the rotation of the motor and thus the movement of lamp.

The angular stopping position of the lamp is adjustable because the insulation block 52, on which spring 51 is mounted, is itself adjustably secured by a bolt and nut 60 secured through a curved slot 61 in housing wall 20, and in addition, rests against an upstanding curved ledge 62 on housing wall 20. Adjustment of the position of the insulation block 52 along the wall slot 61 causes a corresponding adjustment of the extended stopping position of the lamps 35.

To stop the movement of the lamp as it reaches its retracted position against the yieldable bumper 24, a second somewhat J-shaped spring 63 is located on housing wall 20 with its short arm 64 anchored thereto, and electrically connected to a motor retract wire 65 leading to the motor retract field coil 66. A long spring arm 67 extends across the quadrant gear carried arm slot 40 and carries a motor retract contact 68 which it yieldably presses against a second motor retract contact 70 to which is electrically secured a motor retract power wire 71. As the lamp approaches its retracted position, the insulation block 44 on the gear quadrant carried arm 37 hits spring arm 67 and separates motor retract contacts 68 and 70, cutting off the power and permitting the motor brake to stop the operation of the motor and thus the movement of the lamp, the bumper 24 being sufficient to absorb the coasting of the lamp under its momentum, for, in this case, gravity helps to slow up the lamp while the spring 69 absorbs the momentum of the motor, as already described.

To facilitate assembly, the power wires lead to a connector receptacle 72 mounted on the housing 15. A plug 73 adapted to be inserted in the receptacle has a pair of motor power wires 74 and 75 selectively connectable by a toggle switch 76 so as to connect either or neither to the power source 77 and ground 78. A lamp power wire 80 may have a lamp switch 81, if desired, therein, between it and the power source 77. However, this lamp switch 81 is not necessarily present, for, as described above, the lamp necessarily goes out whenever the lamp is retracted to less than ten degrees from full retracted position, due to sliding lamp contact 42 traveling beyond the end of arcuate contact member 45 and its tungsten wedge 47.

In operation, the position of the insulation block 52 is adjusted to the desired angle that the lamp is to be at when the lamp is fully extended before the light is attached to the aircraft. This angle, of course, depends on the angle of the wing of the aircraft on which it is to be placed. The motor 31 is connected in the wiring system by means of the three spring contacts 82 pressing against the three spring contacts 83' extending through the housing 15.

When the toggle switch 76 is connected to the extend power wire side, lamp switch 81 having been operated, if present, the lamp 35 starts to move from the position shown in Figure 1, the contacts being simultaneously in the position shown in Figure 4. In this position, motor extends contacts 54 and 55 are already in contact, (although motor retract contacts 68 and 70 are separated) so that when toggle switch 76 is operated to the extend position, the lamp starts to extend. When it has moved about ten degrees, sliding lamp contact 42 completes the lamp circuit through quadrant lamp contact members 47 and 45, provided the switch 81, if present, has already been operated properly. If, for any reason, it is desired to stop and hold the lamp 35 at any position between the ends of its movement, the toggle switch 76 may be moved to the neutral position, thereby stopping the lamp 35 at an intermediate angle, in which case the various contacts will be in the position shown in Fig. 6. However, permitting the lamp to advance to fully extended position will move the lamp 35 to the position shown in Fig. 2 and the various contacts to the position shown in Fig. 5. As the lamp 35 and contacts approach this extended position, the arm 37 hits the long arm of J-spring 51, making a second contact and power path to the lamp and separating the extend contacts 54 and 55, thereby cutting off the power to the motor extend field coil 58 and stopping the motor, while the arm 37 coasts against and is brought to a stop both by the motor brake and the long arm of J-spring 51.

As soon as the lamp 35 has commenced to extend, the arm 37 has left the second J-spring arm 67, permitting motor retract contacts 68 and 70 to come together, thus being ready to complete the motor retract circuit whenever the toggle switch 76 has been moved to the retract position. Due to the appropriate separation of the motor contacts by the movement of arm 37 to either end of its path, it is never necessary to put the toggle switch in the neutral or intermediate position except when it is desired to stop the lamp 35 at an intermediate position.

While the device has been shown and the structure described in detail, it is obvious that this invention is not to be considered as being limited to the exact form disclosed and that changes may be made therein within the scope of what is claimed without departing from the spirit of the invention.

Having thus set forth and disclosed the nature of the invention, what is claimed is:

1. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means being held by said motor brake against movement when said motor is not operating, said actuating means including a gear quadrant on one edge of which said lamp is secured, said gear quadrant being pivoted on the aircraft part, an arcuate gear track slidably secured on said gear quadrant, strong yieldable means urging said gear track toward the lamp securing edge thereof, and means at the other end of said gear track positively limiting the movement of said gear track toward said lamp securing edge but permitting movement of said gear track away from said lamp securing edge within the limit permitted by said strong yieldable means, whereby said motor may yieldably move said gear track in lamp retracting direction after said lamp has reached fully retracted position and avoid gear or gear track stripping.

2. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means being held by said motor brake against movement when said motor is not operating, said actuating means including a gear quadrant on one edge of which said lamp is secured, said gear quadrant being pivoted on the aircraft part, an arcuate gear track slidably secured on said gear quadrant, strong yieldable means urging said gear track toward the lamp securing edge thereof, and means at the other end of said gear track positively limiting the movement of said gear track toward said lamp securing edge but permitting movement of said gear track away from said lamp securing edge within the limit permitted by said strong yieldable means, said strong yieldable means comprising a headed link pivoted to said gear track and extending through to the inside of the lamp, and a strong coil spring about said link biased between the head thereof and the inside of the lamp whereby said motor may yieldably move said gear track in lamp retracting direction after said lamp has reached fully retracted position and avoid gear or gear track stripping.

3. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means being held by said motor brake against movement when said motor is not operating, said actuating means including a gear quadrant on one edge of which said lamp is secured, said gear quadrant being pivoted on the aircraft part, an arcuate gear track slidably secured on said gear quadrant, strong yieldable means urging said gear track toward the lamp securing edge thereof, and means at the other end of said gear track positively limiting the movement of said gear track toward said lamp securing edge but permitting movement of said gear track away from said lamp securing edge within the limit permitted by said strong yieldable means, said movement limiting means comprising a flanged arm on the end of said gear track adapted to abut an edge of said gear quadrant whereby said motor may yieldably move said gear track in lamp retracting direction after said lamp has reached fully retracted position and avoid gear or gear track stripping.

4. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means being held by said motor brake against movement when said motor is not operating, said actuating means including a gear quadrant on one edge of which said lamp is secured, said gear quadrant being pivoted on the aircraft part, an arcuate gear track slidably secured on said gear quadrant, strong yieldable means urging said gear track toward the lamp securing edge thereof, and means at the other end of said gear track positively limiting the movement of said gear track toward said lamp securing edge but permitting movement of said gear track away from said lamp securing edge within the limit permitted by said strong yieldable means, said movement limiting means comprising a flanged arm on the end of said gear track adapted to abut an edge of said gear quadrant, said strong yieldable means comprising a headed link pivoted to said gear track and extending through to the inside of the lamp, and a strong coil spring about said link biased between the head thereof and the inside of the lamp, whereby said motor may yieldably move said gear track in lamp retracting direction after said lamp has reached fully retracted position and avoid gear or gear track stripping.

5. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, adjustable means operating in timed relation to said lamp to interrupt the operation of said motor and brake said actuating means when said lamp has reached a predetermined extended position, a circuit from a source of power to said lamp, and means operating in timed relation to said lamp to interrupt the operation of said motor when said lamp has reached a predetermined retracted position and to interrupt said lamp circuit while said lamp is at or closely adjacent said predetermined retracted position.

6. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, adjustable means operating in timed relation to said lamp to interrupt the operation of said motor and brake said actuating means when said lamp has reached a predetermined extended position, a circuit from a source of power to said lamp, and means operating in timed relation to said lamp to interrupt the operation of said motor when said lamp has reached a predetermined retracted position and to interrupt said lamp circuit while said lamp is at or closely adjacent said predetermined retracted position, each said means operating in timed relation to said lamp comprising a somewhat J-shaped yieldable spring, a circuit to said motor through said spring, a contact member on said spring, said contact member being in said motor circuit, said spring being mounted in the path of said actuating means to move its contact to circuit interrupting position when said actuating means abuts said spring to thereby interrupt said motor circuit.

7. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, adjustable means operating in timed relation to said lamp to interrupt the operation of said motor and brake said actuating means when said lamp has reached a predetermined extended position, a circuit from a source of power to said lamp, and means operating in timed relation to said lamp to interrupt the operation of said motor when said lamp has reached a predetermined retracted position and to interrupt said lamp circuit while said lamp is at or closely adjacent said predetermined retracted position, each said means operating in timed relation to said lamp comprising a somewhat J-shaped yieldable spring, a circuit to said motor through said spring, a contact member on said spring, said contact member being in said motor circuit, said spring being mounted in the path of said actuating means to move its contact to circuit interrupting position when said actuating means abuts said spring to thereby interrupt said motor circuit, said spring for said adjustable means being mounted on an adjustably mounted insulated base, a pair of lamp circuit contacts carried by said actuating means, a somewhat lengthy lamp power circuit contact member extending from at least the maximum extended position of said actuating means to somewhat short of the retracted position of said actuating means, and adapted to be contacted by one of the actuating means carried lamp circuit contacts, and a second lamp power circuit contact mounted on said adjustably mounted yieldable J-spring in the path of the other actuating means carried lamp circuit contact.

8. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, and adjustable means operating in timed relation to said lamp to interrupt the operation of said motor and brake said actuating means when said lamp has reached a predetermined extended position.

9. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, and adjustable means operating in timed relation to said lamp to interrupt the operation of said motor and brake said actuating means when said lamp has reached a predetermined extended position, said adjustable means operating in timed relation to said lamp comprising a somewhat J-shaped yieldable spring, a circuit to said motor through said spring, a contact member on said spring, said contact member being in said motor circuit, said spring being mounted in the path of said actuating means to move its contact to circuit interrupting position when said actuating means abuts said spring to thereby interrupt said motor circuit.

10. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, and adjustable means operating in timed relation to said lamp to interrupt the operation of said motor and brake said actuating means when said lamp has reached a predetermined extended position, said adjustable means operating in timed relation to said lamp comprising a somewhat J-shaped yieldable spring, a circuit to said motor through said spring, a contact member on said spring, said contact member being in said motor circuit, said spring being mounted in the path of said actuating means to move its contact to circuit interrupting position when said actuating means abuts said spring to thereby interrupt said motor circuit, said spring for said adjustable means being mounted on an adjustably mounted insulated base.

11. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, and means operating in timed relation to said lamp to interrupt the operation of said motor and brake said actuating means when said lamp has reached a predetermined extended position.

12. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, and means operating in timed relation to said lamp to interrupt the operation of said motor and brake said actuating means when said lamp has reached a predetermined extended position, said means operating in timed relation to said lamp comprising a somewhat J-shaped yieldable spring, a circuit to said motor through said spring, a contact member on said spring, said contact member being in said motor circuit, said spring being mounted in the path of said actuating means to move its contact to circuit interrupting position when said actuating means abuts said spring to thereby interrupt said motor circuit.

13. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, a circuit from a source of power to said lamp, and means operating in timed relation to said lamp to interrupt the operation of said motor when said lamp has reached a predetermined retracted position and to interrupt said lamp circuit while said lamp is at or closely adjacent said predetermined position.

14. A landing light for an aircraft comprising in combination with a lamp for movably mounting the same on a part of said aircraft, operating mechanism for said lamp adapted to be mounted wholly within said aircraft part adjacent said lamp and including a motor and motor brake, actuating means driven by said motor for extending said lamp to and yieldably retracting said lamp from light projecting position, said actuating means including a gear quadrant on one edge of which said lamp is secured, an arcuate gear track slidably mounted on said gear quadrant, stop means positively limiting the movement of said gear track in one arcuate direction, and strong yieldable means yieldably and retractably limiting the movement of said gear track on said quadrant in the opposite arcuate direction, said actuating means being held by said motor brake against movement when said motor is not operating, a circuit from a source of power to said lamp, and contact means operating in timed relation to said lamp to interrupt the operation of said motor when said lamp has reached a predetermined retracted position and to interrupt said lamp circuit while said lamp is at or closely adjacent said predetermined retracted position, said contact means including a somewhat J-shaped yieldable spring, a pair of lamp circuit contacts carried by said actuating means, a somewhat lengthy lamp power circuit contact member extending from at least the maximum extended position of said actuating means to somewhat short of the retracted position of said actuating means, and adapted to be contacted by one of the actuating means carried lamp circuit contacts, and a second lamp power circuit contact mounted on said adjustably mounted yieldable J-spring in the path of the other actuating means carried lamp circuit contact.

WARREN G. GRIMES.

REFERENCES CITED

The following references are of record in the file of this patent:

UNITED STATES PATENTS

| Number | Name | Date |
|---|---|---|
| 2,105,137 | Bruner | Jan. 11, 1938 |
| 2,267,974 | Harley | Dec. 20, 1941 |
| 2,362,110 | Meyerhoefer | Nov. 7, 1944 |
| 2,403,108 | Meyerhoefer | July 2, 1946 |

FOREIGN PATENTS

| Number | Country | Date |
|---|---|---|
| 513,880 | England | Oct. 24, 1939 |